US010715967B1

(12) United States Patent
Gan et al.

(10) Patent No.: US 10,715,967 B1
(45) Date of Patent: Jul. 14, 2020

(54) METHOD FOR REAL-TIME TALK-GROUP CREATION WITHIN A PUSH TO TALK FOR AN INCIDENT REPORT SYSTEM

(71) Applicant: MOTOROLA SOLUTIONS, INC., Chicago, IL (US)

(72) Inventors: Guo Dong Gan, Kuala Lumpur (MY); Moheinvarman Subramaniam, Batu Ferringhi (MY); Swee Yee Soo, Gelugor (MY); Wei Lun Chan, Simpang Ampat (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/576,824

(22) Filed: Sep. 20, 2019

(51) Int. Cl.
*H04W 4/12* (2009.01)
*H04W 4/08* (2009.01)
*G06F 16/23* (2019.01)
*H04W 4/10* (2009.01)

(52) U.S. Cl.
CPC .......... *H04W 4/08* (2013.01); *G06F 16/2365* (2019.01); *H04W 4/10* (2013.01); *H04W 4/12* (2013.01)

(58) Field of Classification Search
CPC .......... H04W 4/08; H04W 4/10; H04W 4/12; H04W 4/025; G06F 16/2365; H04L 29/06442
USPC .................................................. 455/519, 518
See application file for complete search history.

(56) References Cited

U.S. PATENT DOCUMENTS

| | | | | |
|---|---|---|---|---|
| 5,513,378 A * | 4/1996 | Ranz | .......................... | H04L 1/22 455/67.14 |
| 6,073,161 A * | 6/2000 | Deboskey | ........... | G06F 16/1767 709/200 |
| 6,240,414 B1 * | 5/2001 | Beizer | ................. | G06F 16/1787 |
| 6,885,874 B2 * | 4/2005 | Grube | ................... | H04W 84/08 455/520 |
| 6,895,551 B1 * | 5/2005 | Huang | ................ | G06F 16/9566 715/205 |
| 6,999,465 B2 * | 2/2006 | McDonald | ............ | H04L 1/1854 370/432 |
| 7,499,700 B2 * | 3/2009 | Dillon | ................... | H04W 24/00 455/423 |
| 8,429,287 B2 * | 4/2013 | Sullivan | ................... | H04N 7/24 370/213 |
| 8,700,028 B2 * | 4/2014 | Harris | ................. | H04L 41/0681 455/419 |
| 8,805,431 B2 * | 8/2014 | Vasavada | ............ | H04L 65/4061 455/518 |
| 8,825,096 B2 * | 9/2014 | Bekiares | ............. | H04L 12/1822 379/202.01 |
| 9,015,037 B2 * | 4/2015 | Myslinski | .............. | G06Q 10/10 704/9 |
| 9,161,272 B2 * | 10/2015 | Ofir | ......................... | H04L 65/60 |
| 9,307,370 B1 * | 4/2016 | Pai | .......................... | H04W 4/10 |
| 9,313,621 B2 * | 4/2016 | Tham | ...................... | H04W 4/10 |
| 9,595,184 B2 * | 3/2017 | Almansour | ........... | H04L 63/123 |
| 9,686,665 B2 * | 6/2017 | Igumnov | ............... | H04W 4/029 |
| 9,693,206 B2 * | 6/2017 | Bishop, Jr. | ............. | H04W 4/10 |
| 9,693,211 B2 * | 6/2017 | Igumnov | ............... | H04W 4/029 |
| 9,978,283 B2 * | 5/2018 | Jedrzejewski | ........ | H04W 4/027 |

(Continued)

*Primary Examiner* — Hai V Nguyen
(74) *Attorney, Agent, or Firm* — Kenneth A. Haas

(57) ABSTRACT

A method and apparatus for notifying authors of a conflict in a report is described herein. During operation authors' devices will be dynamically added to a particular talkgroup if it is determined that a conflict in a report has been detected.

15 Claims, 7 Drawing Sheets

(56) References Cited

U.S. PATENT DOCUMENTS

| | | | | |
|---|---|---|---|---|
| 10,070,275 B1* | 9/2018 | McGary | | H04W 4/08 |
| 10,169,119 B1* | 1/2019 | Snyder | | G06F 11/004 |
| 10,178,708 B1* | 1/2019 | Gan | | H04L 67/12 |
| 10,240,936 B1* | 3/2019 | Saad | | G01C 21/3407 |
| 10,354,169 B1* | 7/2019 | Law | | G06N 3/08 |
| 10,419,312 B2* | 9/2019 | Alazraki | | H04L 43/0823 |
| 10,425,986 B2* | 9/2019 | Tian | | H04M 3/42221 |
| 10,469,996 B2* | 11/2019 | Zhao | | H04W 4/021 |
| 10,477,406 B2* | 11/2019 | Cutcher | | H04B 17/318 |
| 10,582,345 B1* | 3/2020 | Lim | | H04W 4/08 |
| 2002/0114302 A1* | 8/2002 | McDonald | | H04L 1/1854 370/338 |
| 2003/0100326 A1* | 5/2003 | Grube | | H04W 84/08 455/515 |
| 2005/0037794 A1* | 2/2005 | Namm | | H04W 84/08 455/519 |
| 2006/0128371 A1* | 6/2006 | Dillon | | H04W 24/00 455/423 |
| 2008/0057877 A1* | 3/2008 | Pinder | | H04W 24/02 455/75 |
| 2009/0172782 A1* | 7/2009 | Taglienti | | H04W 28/16 726/4 |
| 2009/0233595 A1* | 9/2009 | Harris | | H04L 67/24 455/425 |
| 2010/0281178 A1* | 11/2010 | Sullivan | | H04N 21/2665 709/231 |
| 2013/0054612 A1* | 2/2013 | Danielyan | | G06F 40/284 707/741 |
| 2013/0156175 A1* | 6/2013 | Bekiares | | H04W 4/10 379/202.01 |
| 2014/0244524 A1* | 8/2014 | Brestoff | | G06Q 10/06 705/311 |
| 2014/0273916 A1* | 9/2014 | Roy | | H04B 7/14 455/404.1 |
| 2014/0349626 A1* | 11/2014 | Bishop, Jr. | | H04W 4/10 455/414.4 |
| 2015/0117397 A1* | 4/2015 | Ofir | | H04L 65/4076 370/331 |
| 2015/0296351 A1* | 10/2015 | Tham | | H04B 1/46 455/518 |
| 2016/0307563 A1* | 10/2016 | Shrivastava | | G06F 40/289 |
| 2017/0006448 A1* | 1/2017 | Igumnov | | H04W 4/029 |
| 2017/0006449 A1* | 1/2017 | Igumnov | | H04W 4/024 |
| 2017/0061544 A1* | 3/2017 | McClain | | G06Q 40/08 |
| 2017/0265045 A1* | 9/2017 | Igumnov | | H04W 4/90 |
| 2017/0294131 A1* | 10/2017 | Jedrzejewski | | H04W 4/029 |
| 2018/0063872 A1* | 3/2018 | Tian | | H04M 3/42221 |
| 2018/0114039 A1* | 4/2018 | Sion | | G09C 1/00 |
| 2018/0157601 A1* | 6/2018 | Bryant | | G06F 12/12 |
| 2018/0253814 A1* | 9/2018 | Kaguma | | G06Q 50/265 |
| 2018/0278504 A1* | 9/2018 | Alazraki | | H04L 12/1822 |
| 2018/0367582 A1* | 12/2018 | Kaplita | | H04L 67/34 |
| 2019/0005978 A1* | 1/2019 | Barnett | | G10L 15/26 |
| 2019/0014602 A1* | 1/2019 | Gan | | H04L 29/06442 |
| 2019/0050238 A1* | 2/2019 | Lim | | G06F 9/453 |
| 2019/0069337 A1* | 2/2019 | Zhao | | H04W 76/45 |
| 2019/0090137 A1* | 3/2019 | Cutcher | | H04W 72/02 |
| 2019/0094031 A1* | 3/2019 | Saad | | G06Q 10/06 |
| 2019/0197354 A1* | 6/2019 | Law | | G06N 3/08 |
| 2019/0197369 A1* | 6/2019 | Law | | G06K 9/0063 |
| 2019/0222698 A1* | 7/2019 | Musik | | H04M 3/56 |
| 2019/0245629 A1* | 8/2019 | Gan | | H04W 12/00305 |
| 2019/0259382 A1* | 8/2019 | Stogner | | G10L 15/18 |
| 2019/0287199 A1* | 9/2019 | Messerges | | G06F 16/27 |
| 2019/0287200 A1* | 9/2019 | Schuler | | H04L 9/3239 |
| 2019/0289479 A1* | 9/2019 | Simms | | H04W 24/02 |
| 2020/0075056 A1* | 3/2020 | Yang | | H04W 4/44 |
| 2020/0127812 A1* | 4/2020 | Schuler | | H04L 63/0428 |
| 2020/0134760 A1* | 4/2020 | Messerges | | G06F 16/27 |

\* cited by examiner

METHOD FOR REAL-TIME TALK-GROUP CREATION WITHIN A PUSH TO TALK FOR AN INCIDENT REPORT SYSTEM

BACKGROUND OF THE INVENTION

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

As part of a first responder's duties, various documentations such as reports and forms need to be filled out by first responders after certain incidents. Due to time constraints, many of the documentations cannot be filled in their entirety while at a particular incident, leaving the remainder of the documentation to be filled at a later time. This often leads to officers having to remember critical information, which sometimes conflicts with other officers' recollections of the event and incident. Because PTT and talkgroups are so ubiquitous in the public-safety realm, it would be beneficial if PTT and talkgroups could be used so that such conflicting information can be discussed among officers so a more accurate representation and recollection of an event can be detailed within a report.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
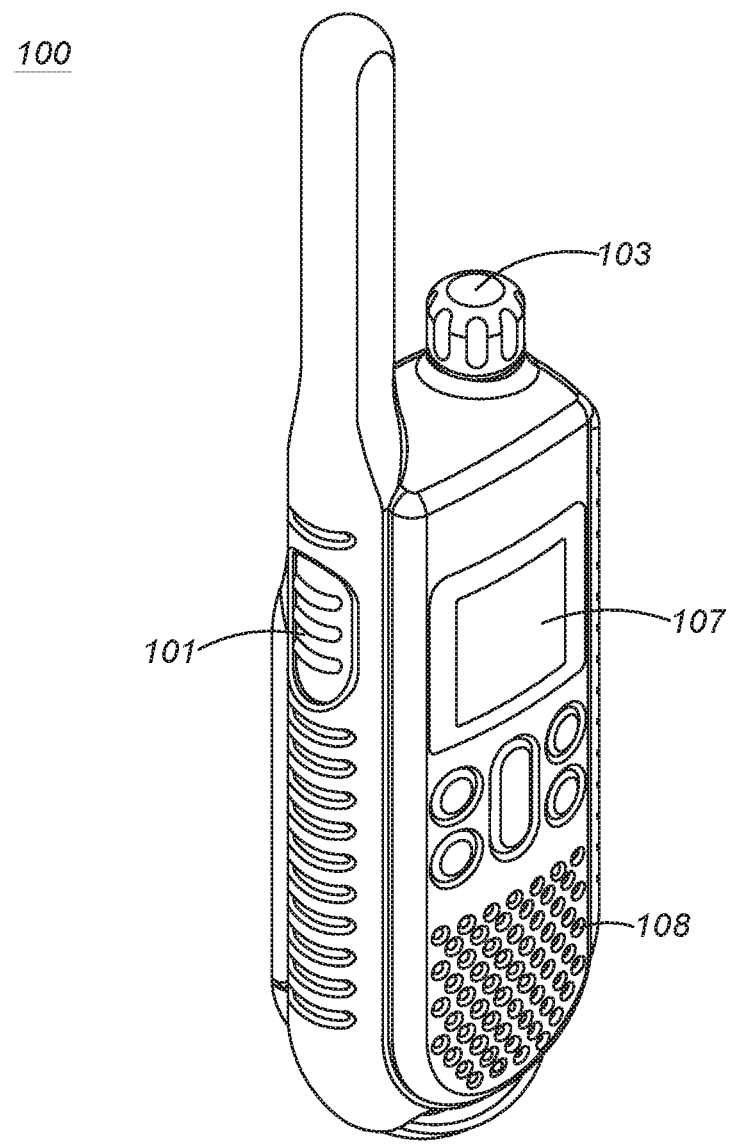
FIG. 1 illustrates push-to-talk (PTT) radio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for notifying authors of a conflict in a report is described herein. During operation authors' devices will be dynamically added to a particular talkgroup if it is determined that a conflict in a documentation such as a report has been detected.

Expanding on the above, when multiple officers are assigned to an incident scene, the officers are often required to write a report on what took place at the incident. Written reports about the incident are compared, and all officers assigned to the incident may be joined in a unique talkgroup if any discrepancies exist within the multiple reports.

Consider the following example: Multiple first responders are assigned to assist in a robbery. During the incident, a car chase may ensue to eventually capture the perpetrators. Each officer will be required to write a report of what happened and submit the report to a server. The server may check various fields of the submitted reports to determine if the reports contain any discrepancies among them. (For example, Officer Jones may submit that the perpetrators were captured on $1^{st}$ Avenue, while Officer Smith may submit that the perpetrators were captured on $3^{rd}$ Avenue). If the server determines any discrepancies within the submitted reports, the server will cause a talkgroup to be created and add all officers that were assigned to the incident to the talkgroup. (Alternatively, the officers assigned to the incident may be added to an existing talkgroup). The officers may be notified of the discrepancy. Discussion among the officers over the talkgroup may remedy the discrepancy. The officers can then edit their reports to eliminate the discrepancy, or choose to keep the discrepancy within their reports.

Members of the talkgroup are chosen as those individuals that were assigned to a particular incident. A computer-aided dispatch (CAD) incident identifier (ID) is utilized to determine an incident assigned to an officer. This ID could be something as simple as a number, or something as complicated as an identification that is a function of populated fields, one of which may comprise an incident type. Thus, all officers that were assigned a same CAD_ID will have their respective reports about the incident analyzed to determine if any discrepancy exists within the various reports. The CAD_ID can also be used to prioritize what populated fields in the various reports are to be compared for any discrepancy. If there is any discrepancy, a talkgroup will be created and those individuals that were assigned to the same CAD_ID will be added as members of the talkgroup.

FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting over a specific talkgroup. Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to highlight a particular talkgroup, any activation (pushing) of the PTT button 101 will cause radio 100 to communicate over the highlighted talkgroup.

Figure 2:
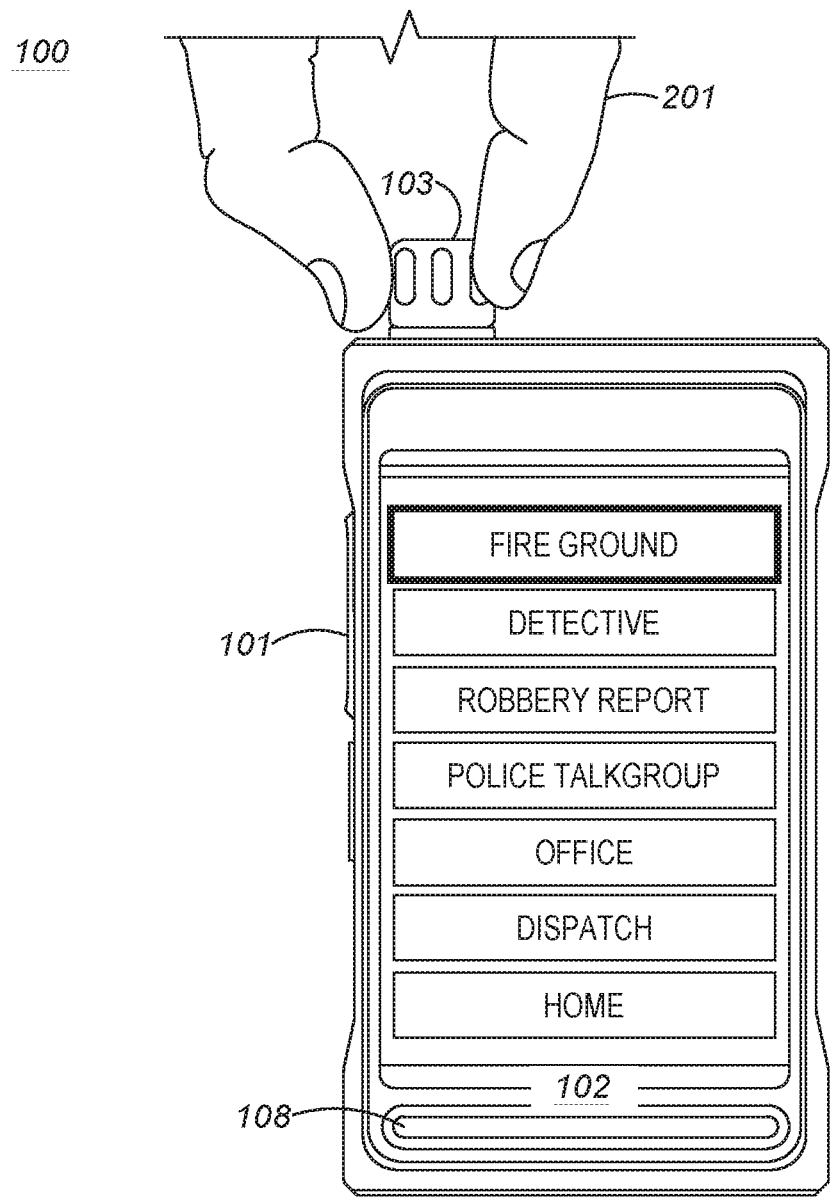
FIG. 2 illustrates push-to-talk (PTT) radio.

It should be noted that display 102 may display the names of the talkgroups, which include the names of "report" talkgroups that are created when a discrepancy within reports is detected. For example, as shown in FIG. 2, the Police Talkgroup and the Fire ground talkgroup may be displayed, so when highlighted, communications to other police officers, or firemen take place upon the pushing of the PTT button 101. However, as shown, a "Robbery Report" talkgroup is also displayed, with, activation of the PTT button causing communications to take place among all individuals that were assigned to the Robbery.

Figure 3:
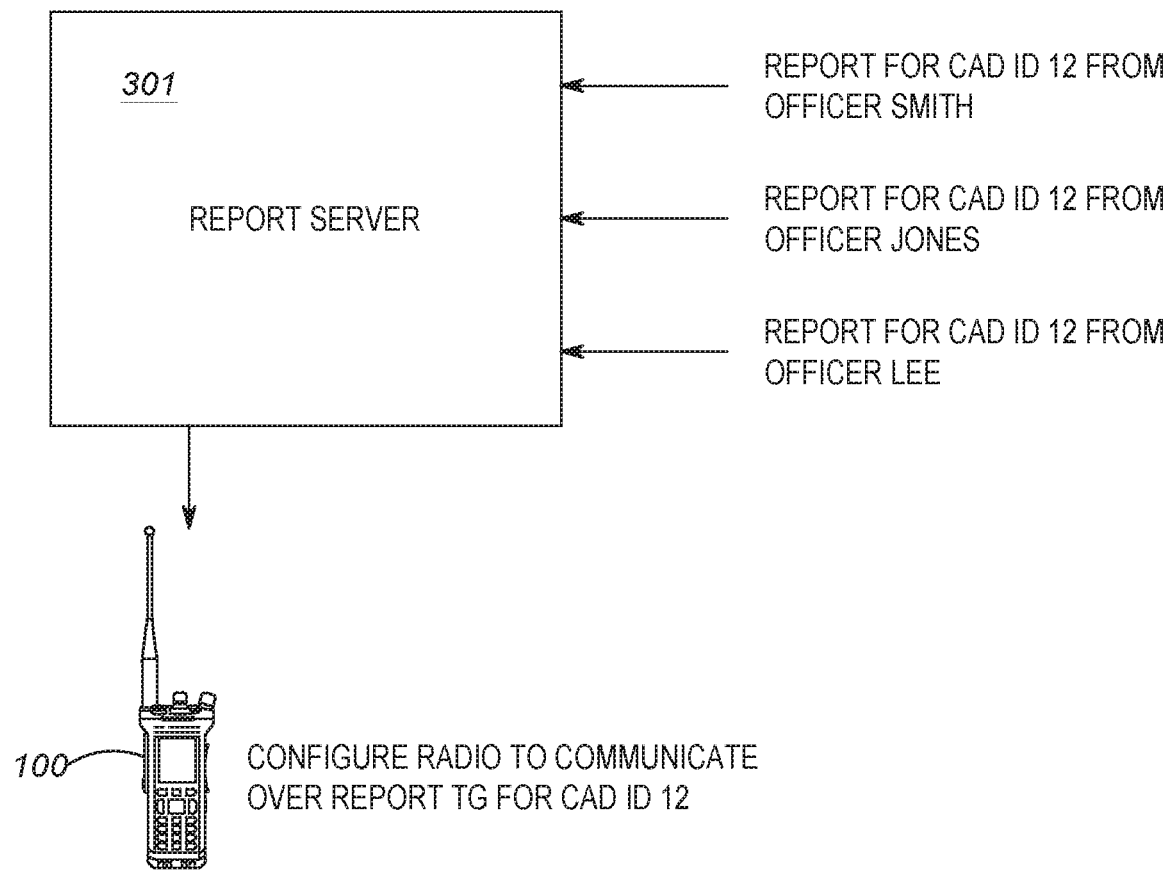
FIG. 3 illustrates a server.

In order to accomplish the above, a report server 301 is provided (shown in FIG. 3). The report server is operable to analyze all reports about a certain incident (identified by a CAD_ID), and determine if discrepancies in the reports exist. During operation, reports for various incidents (identified by CAD_ID, in this case CAD_ID 12) enter server 301. Server 301 then determines if discrepancies exist within the reports, and if so, configures radio 100 to communicate on a particular talkgroup, created for CAD_ID 12.

It should be noted that report server 301 may create the new talkgroup by sending a request to a core network to perform a "dynamic regrouping". As known in the art, with the dynamic regrouping feature, server 301 can seamlessly cause users to be added to a group without any intervention from radio operators.

Figure 4:
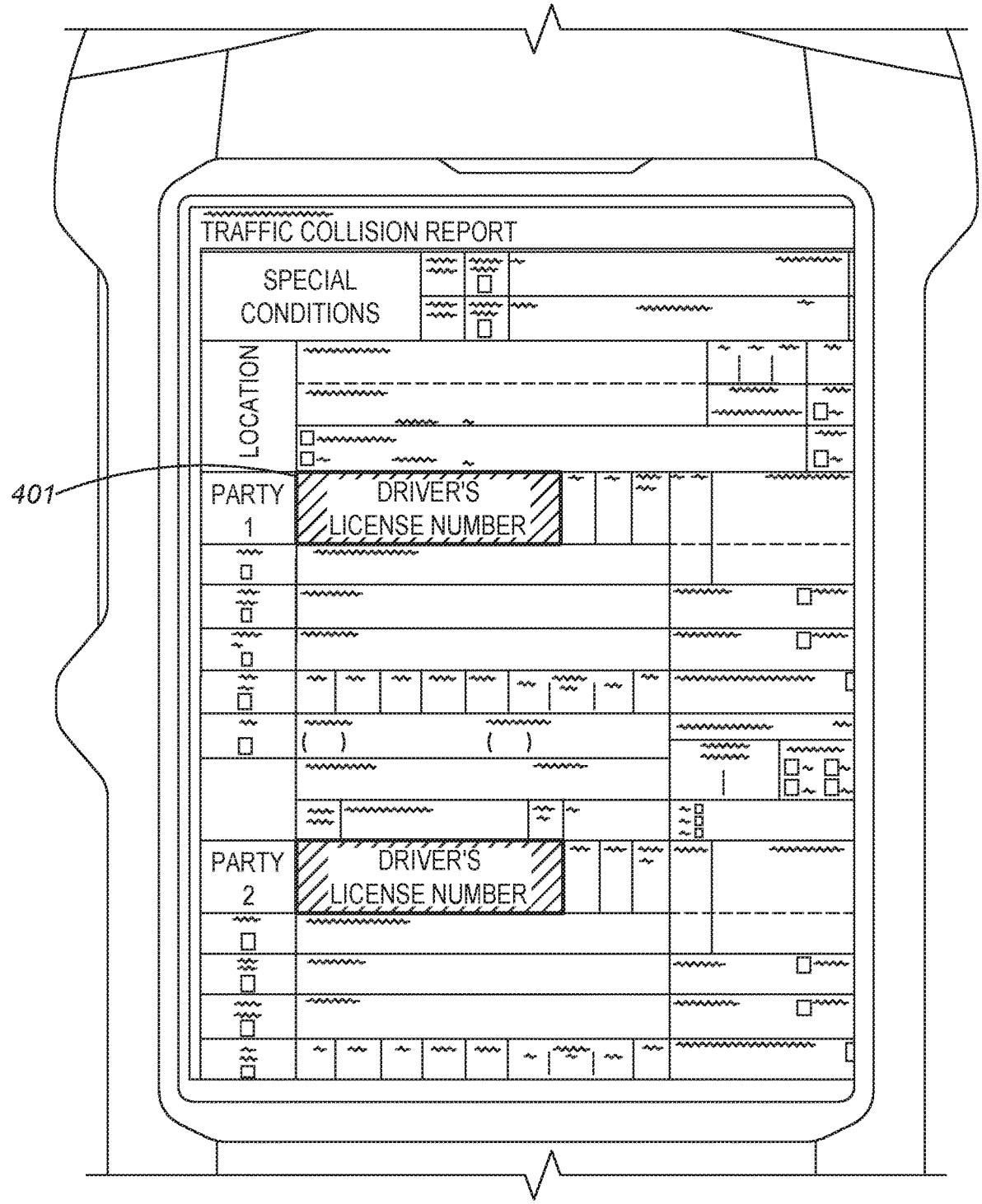
FIG. 4 illustrates a form having fields.

In one embodiment of the present invention, report server 301 determines if discrepancies exist within the reports by comparing the same field in each report. As shown in FIG. 4, officers are presented forms to fill out for particular incidents. These forms comprise fields 401 (only one field labelled in FIG. 4). One field might comprise a CAD_ID field, while other field comprise information that is relevant to a particular incident. Server 301 will compare forms associated with the same CAD_ID by comparing each field of the multiple reports to determine if a discrepancy exists for a particular field.

There are several techniques to determine the officers that were assigned to a particular incident. In a first embodiment of the present invention, server 301 will analyze the reports to determine those reports belonging to a particular incident, as determined by CAD_ID. From the reports belonging to the same incident, an officer's identification may be determined. For example, an officer's identification may be provided in a particular form of the field. In another embodiment of the present invention, officers that were involved in a particular incident may be provided to server (for example by a dispatch operator) prior to determining if discrepancies exist within the reports.

As discussed, modern two-way radio systems comprise talkgroups, where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Therefore, once assigned to a particular report talkgroup, the radio may communicate with all first responders that were assigned to the particular incident. Thus, server 301 is operable to create specific talkgroups with members that comprise those individuals that were assigned to a particular incident that occurred in the past (for example, earlier in the day). The trigger for the talkgroup creation is when reports about the incident contain discrepancies from report to report.

Figure 5:
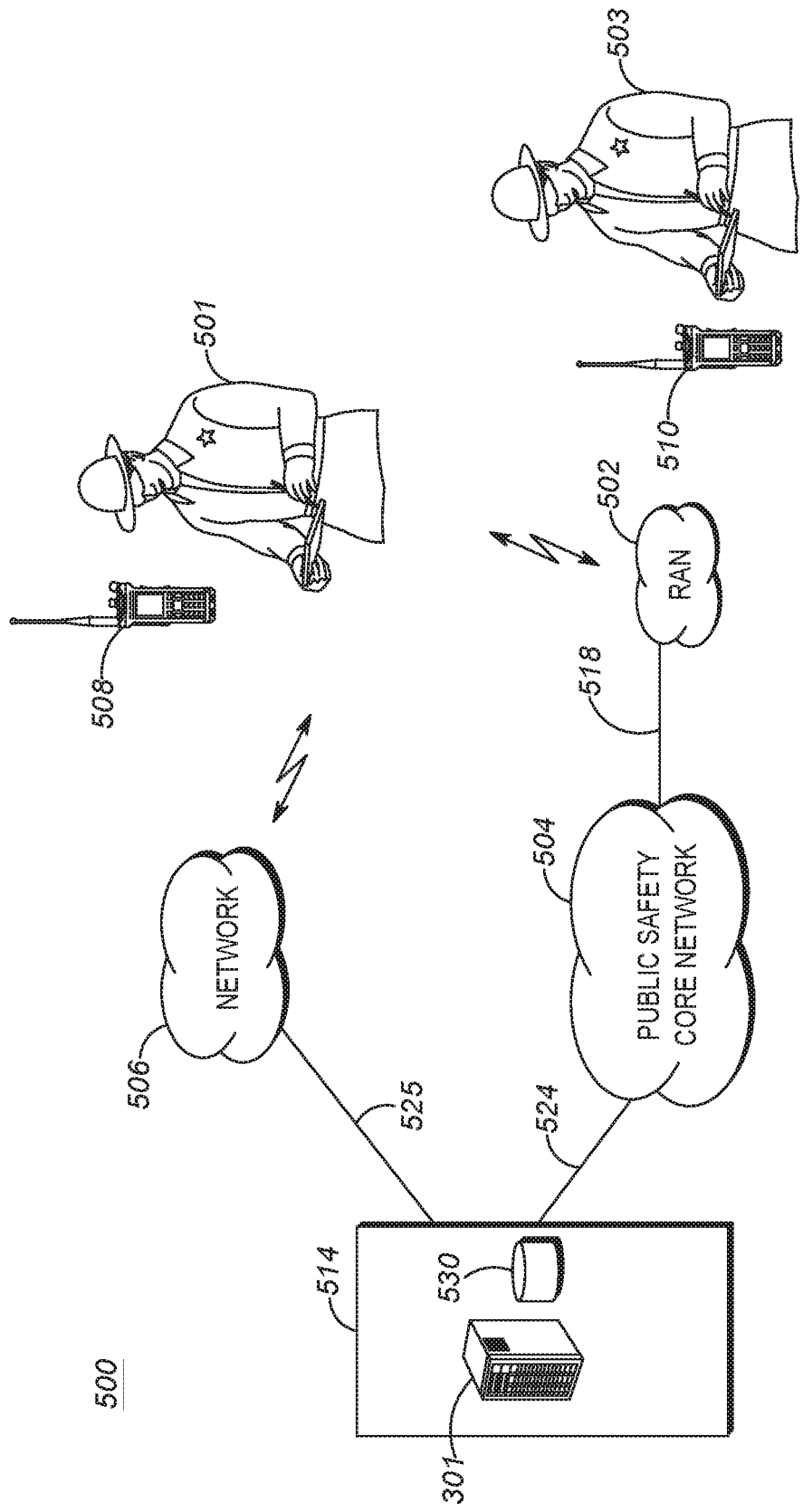
FIG. 5 depicts an example communication system that incorporates a report server.

FIG. 5 illustrates a general operating environment for the present invention. Environment 500 includes one or more radio access networks (RANs) 502 (only one shown in FIG. 5), a public-safety core network 504, devices 508-510, dispatch center 514, and communication links 525, 518, 524. In a preferred embodiment of the present invention, dispatch center 514 serves as a public-safety dispatch center 514. Server 301 receives reports from officers 501-503 and stores the reports in database 530.

Communication between report server 301 and devices 508-510 takes place through an intervening network such as, but not limited to a high-speed data network 506 such as a cellular communication system and/or public-safety core network 504 and RAN 502. Thus, as shown in FIG. 5, two separate networks exist, namely public-safety core network 504 for primarily carrying voice traffic from police radios, and a high-speed network 506 (e.g., Verizon, Spring, AT&T, . . . , etc.) for carrying high-speed data. Each of these networks may be utilized for transmitting requests to access software and ACKs/NACKs.

Each RAN 502 includes typical RAN elements such as base stations, base station controllers (BSCs), routers, switches, and the like, arranged, connected, and programmed to provide wireless service to user equipment (e.g., devices 508-510) operated by officers 501-503) in a manner known to those of skill in the relevant art. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

In a similar manner, network 506 includes elements such as base stations, base station controllers (BSCs), routers, switches, and the like, arranged, connected, and programmed to provide wireless service and data to user equipment (e.g., devices 508-510 operated by officers 501-503 in a manner known to those of skill in the relevant art.

Devices 508-510 may be any suitable computing and/or communication devices operable to engage in wireless communication over an air interface as is known to those in the relevant art. Devices 508-510 comprises any device capable of communication over a report talkgroup. Mobile devices 508-510 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

It should be noted that while only two officers 501-503 and two devices 508-510 are shown in FIG. 5, one of ordinary skill in the art will recognize that hundreds of officers and devices may actually exist in environment 500.

During operation, officers 501-503 are assigned to a particular incident. As part of the assignment, officers 501-503 are tasked to write a report about the incident. The report may be written at the incident utilizing devices 508-510, or may be written after the incident has been disposed of, at for example, a desktop or laptop computer. Regardless of how or where the reports are generated, the written reports are then submitted to report server 301 through networks 502, 504, and/or 506. Alternatively, the reports may be written via computers (not shown) existing at dispatch center 514, or a police station, and submitted directly to server 301. All reports are stored in database 530. It should be noted that report server Server 301 analyzes the reports stored in database 530. For each incident (identified by CAD_ID), the reports are compared, and it is determined if a discrepancy exists. Discrepancies may be determined by determining if, for a particular field of each report, a discrepancy exists among the various reports. For example, a "date" field may comprise a first date for 34 reports, however, the date field may comprise a second date for 1 report.

When a discrepancy is detected by server 301, server 301 accesses network 504 and creates a specific "report" talkgroup. The members of the talkgroup are chosen to be those members that had been assigned to the incident. It should be noted, that in this particular embodiment of the present invention, the talkgroup is created after the incident has been disposed of, and only if there exist discrepancies within reports submitted about the incident.

As is evident, server 301 maps whether or not to create a talkgroup based on whether or not discrepancies exist within reports. The mapping process preferably comprises an operation that associates each element of a given set (the domain) with one or more elements of a second set (the range). Whether or not discrepancies exist within the reports comprises the domain, while whether or not to create the talkgroup comprises the range. The mapping is explicit based on predefined rules.

Server 301 maps whether or not report discrepancies exist to whether or not a talkgroup is created. More specifically, if whether or not discrepancies exist (x) is an element of a group X (i.e., "discrepancies exist" or "no discrepancies exist"), we say that f "takes the value" or "maps to" f(x) at x. The set X is called the domain of the function f. The set of possible outcomes of f(x) is called the range. In this case, the range comprises whether or not to create a talkgroup, so f(x) comprises either "create talkgroup" or "do not create talkgroup".

Figure 6:
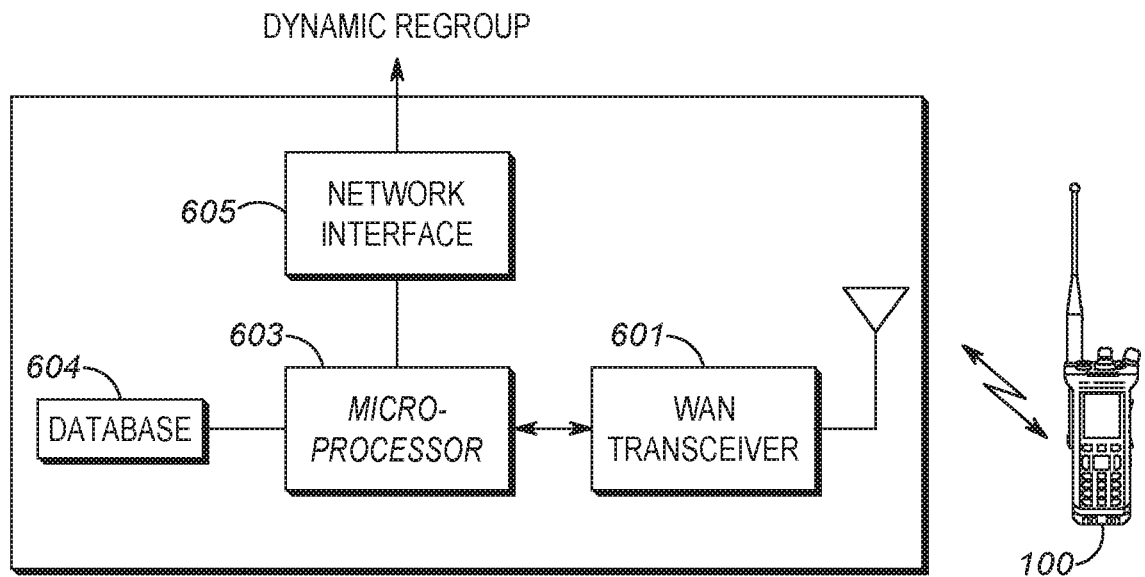
FIG. 6 is a block diagram of a report server.

FIG. 6 is a block diagram of server 301. In an embodiment, server 301 is embodied within a dispatch center, however in alternate embodiments the device may be embodied within the public-safety core network 504, or more computing devices in a cloud compute cluster (not shown), or some other communication device not illustrated in FIG. 5, and/or may be a distributed communication device across two or more entities.

FIG. 6 shows those components (not all necessary) for server 301 to determine if discrepancies exist in reports on a common incident, map whether or not discrepancies exist to whether or not a talkgroup should be created with users assigned to the incident. For ease of illustration some components have been left out of FIG. 5. For example, a graphical user interface that allows an operator to view reports or input data to server 310 is not shown since that component is not necessary for understanding the following discussion.

As shown, server 301 may include a wide-area-network (WAN) transceiver 601 (e.g., a transceiver that utilizes a public-safety communication-system protocol), logic circuitry 603, database 604, and network interface 605. In other implementations, server 301 may include more, fewer, or different components. Regardless, all components are connected via common data busses as known in the art.

WAN transceiver 601 may comprise well known long-range transceivers that utilize any number of network system protocols. (As one of ordinary skill in the art will recognize, a transceiver comprises both a transmitter and a receiver for transmitting and receiving data). For example, WAN transceiver 601 may be operable to utilize a next-generation cellular communications protocol operated by a cellular service provider, or any public-safety protocol such as an APCO 25 network or the FirstNet broadband network. WAN transceiver 601 receives communications from users over a particular talkgroup. It should be noted that WAN transceiver 601 is shown as part of server 301, however, WAN transceiver 601 may be located in RAN 502, with a direct link to server 301.

Logic circuitry 603 comprises a digital signal processor (DSP), general purpose microprocessor, a programmable logic device, or application specific integrated circuit (ASIC) and is operable to create a report talkgroup as described herein.

Database 604 is provided. Database 604 comprises standard memory (such as RAM, ROM, . . . , etc) and serves to store reports on incidents submitted by officers.

Finally, network interface 605 provides processing, modulating, and transceiver elements that are operable in accordance with any one or more standard or proprietary wireless interfaces, wherein some of the functionality of the processing, modulating, and transceiver elements may be performed by means of the logic circuitry 603 through programmed logic such as software. Examples of network interfaces (wired or wireless) include Ethernet, T1, USB interfaces, IEEE 802.11b, IEEE 802.11g, etc.

With the above in mind, FIG. 6 provides for an apparatus comprising a database comprising a plurality of reports about a particular incident that happened in the past, and logic circuitry operable to access a first report about the particular incident, access a second report about the particular incident, determine that a discrepancy exists between the first and the second reports, and cause a talkgroup to be created based on the fact that the discrepancy exists, wherein members of the talkgroup comprise authors of the first and the second report.

As discussed above, the authors of the first and the second report were assigned to the incident, and the talkgroup can be created by sending a command (such as a dynamic regroup command) to create the talkgroup to infrastructure equipment.

As discussed above, individuals assigned to the incident are also added to the talkgroup by determining an identification of the incident, determining who was assigned to the incident, and causing the talkgroup to include those assigned to the incident. As discussed, the identification of the incident may comprise a computer aided dispatch identification (CAD_ID).

It should be noted that logic circuitry 603 can also be operable to notify members of the talkgroup that a talkgroup has been created and that conflicting information exists within the incident reports. This notification can be very specific, detailing the discrepancies, talkgroup members, and other information. Alternatively, this notification may simply comprise a notification telling members of the talkgroup that a new talkgroup about a particular incident has been created. The notification can be audible or visual. For example, the notification may simply comprise a text message to those individuals who were added to the talkgroup.

Figure 7:
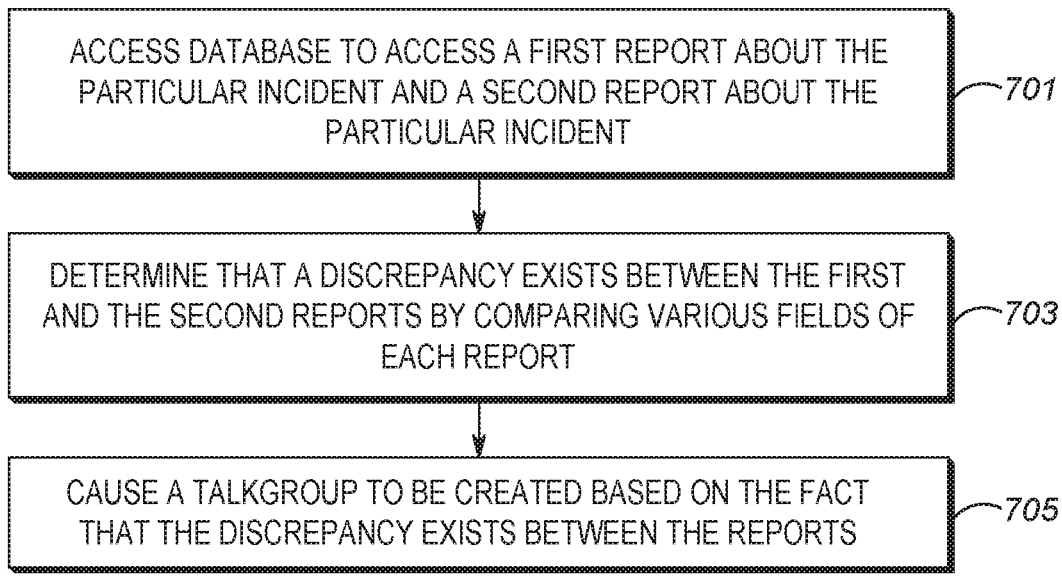
FIG. 7 is a flow chart showing operation of the server of FIG. 5.

FIG. 7 is a flow chart showing operation of the server of FIG. 6. The logic flow begins at step 701 where logic circuitry 603 accesses database 604 to access a first report about the particular incident and a second report about the particular incident. At step 703, logic circuitry 603 determines that a discrepancy exists between the first and the second reports by comparing various fields of each report. At step 705, logic circuitry causes a talkgroup to be created based on the fact that the discrepancy exists between the reports.

As discussed, members of the talkgroup comprise authors of the first and the second report and the authors of the first and the second report were assigned to the incident. The step of causing the talkgroup to be created may comprise the step of logic circuitry 603 utilizing network interface 605 or WAN transceiver 601 to send a command (such as a dynamic regroup command) to create the talkgroup to infrastructure equipment.

As discussed above, logic circuitry 603 will also determine an identification of the incident (by, for example, using the CAD_ID within the reports), determine who was assigned to the incident, and cause the talkgroup to include those assigned to the incident.

Figure 8:
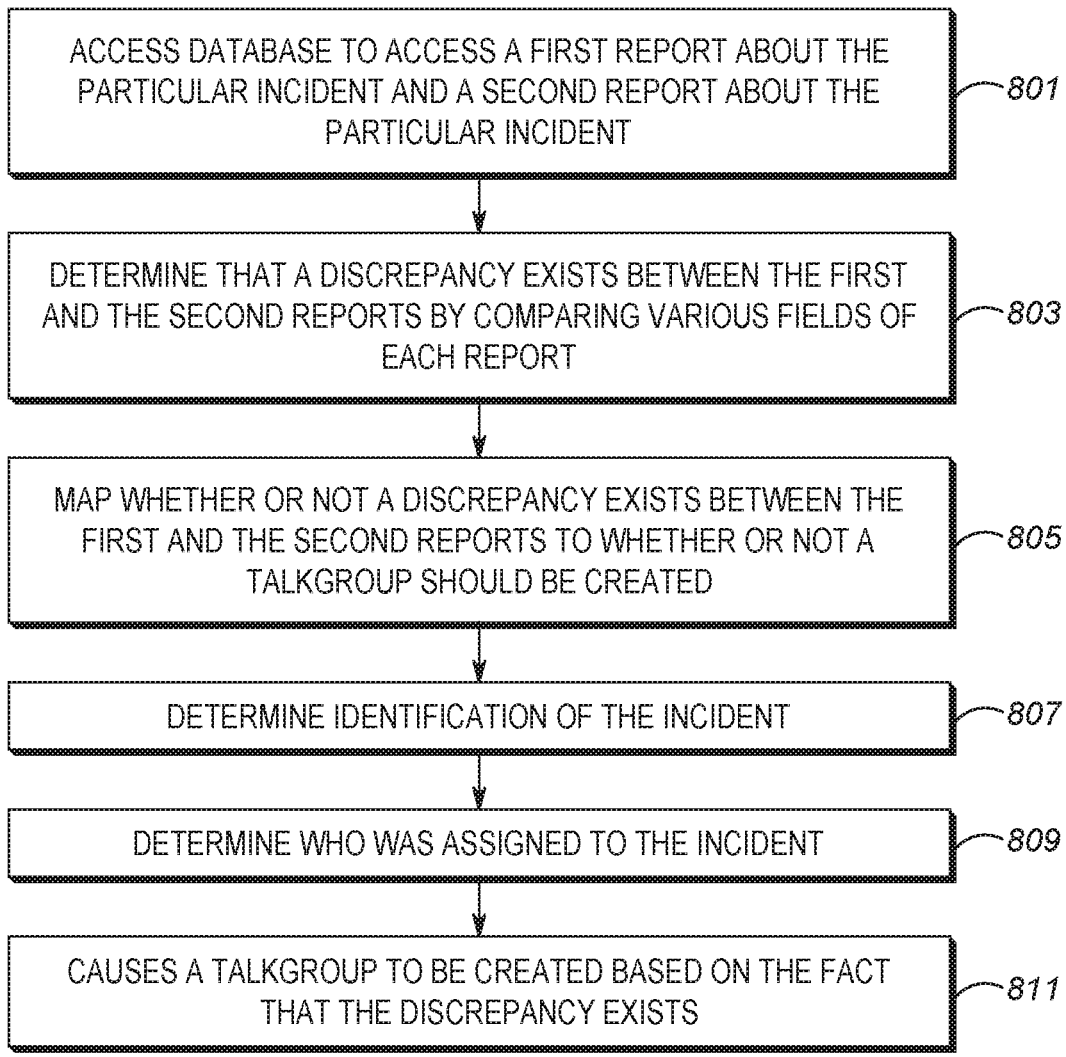
FIG. 8 is a flow chart showing operation of the server of FIG. 5.

FIG. 8 is a flow chart showing operation of server 301. The logic flow begins at step 801 where logic circuitry 603 accesses database 604 to access a first report about the particular incident and a second report about the particular incident. At step 803, logic circuitry 603 determines that a discrepancy exists between the first and the second reports by comparing various fields of each report. The logic flow continues to step 805 where logic circuitry maps whether or not a discrepancy exists between the first and the second reports to whether or not a talkgroup should be created.

An identification of the incident is determined (step 807) by logic circuitry 603 along with who was assigned to the incident (step 809). This is preferably accomplished by logic circuitry 603 analyzing at least the first and the second report to determine an incident identification, along with authors of the reports.

Finally, at step 811 logic circuitry 603 causes a talkgroup to be created based on the fact that the discrepancy exists, wherein members of the talkgroup comprise authors of the first and the second report and those who were assigned to the incident.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a database comprising a plurality of reports about a particular incident that happened in the past;
   logic circuitry operable to:
      access a first report about the particular incident;
      access a second report about the particular incident;
      determine that a discrepancy exists between the first and the second reports; and
      cause a talkgroup to be created based on a fact that the discrepancy exists, wherein members of the talkgroup comprise authors of the first and the second report.

2. The apparatus of claim 1 wherein the authors of the first and the second report were assigned to the particular incident.

3. The apparatus of claim 1 wherein the apparatus causes the talkgroup to be created by sending a command to create the talkgroup to infrastructure equipment.

4. The apparatus of claim 3 wherein the command comprises a dynamic regroup command.

5. The apparatus of claim 1 wherein the logic circuitry is also operable to:
   determine an identification of the particular incident;
   determine who was assigned to the particular incident; and
   cause the talkgroup to include those assigned to the particular incident.

6. The apparatus of claim 5 wherein the identification of the particular incident comprises a computer aided dispatch identification (CAD_ID).

7. The apparatus of claim 1 wherein the logic circuitry is further operable to:
   notify members of the talkgroup that a talkgroup has been created and that conflicting information exists within the incident reports.

8. A method comprising the steps of:
   accessing a first report about a particular incident;
   accessing a second report about the particular incident;
   determining that a discrepancy exists between the first and the second reports; and
   causing a talkgroup to be created based on a fact that the discrepancy exists, wherein members of the talkgroup comprise authors of the first and the second report.

9. The method of claim 8 wherein authors of the first and the second report were assigned to the particular incident.

10. The method of claim 8 wherein the step of causing the talkgroup to be created comprises the step of sending a command to create the talkgroup to infrastructure equipment.

11. The method of claim 10 wherein the command comprises a dynamic regroup command.

12. The method of claim 8 further comprising the steps of:
determining an identification of the particular incident;
determining who was assigned to the particular incident; and
causing the talkgroup to include those assigned to the particular incident.

13. The method of claim 12 wherein the identification of the particular incident comprises a computer aided dispatch identification (CAD_ID).

14. The method of claim 8 further comprising the step of;
notifying members of the talkgroup that a talkgroup has been created and that conflicting information exists within the incident reports.

15. A method comprising the steps of:
accessing a first report about a particular incident;
accessing a second report about the particular incident;
determining that a discrepancy exists between the first and the second reports;
mapping whether or not a discrepancy exists between the first and the second reports to whether or not a talkgroup should be created;
determining an identification of the particular incident;
determining who was assigned to the particular incident;
causing a talkgroup to be created based on a fact that the discrepancy exists, wherein members of the talkgroup comprise authors of the first and the second report and those who were assigned to the particular incident.

* * * * *